(12) United States Patent
Parks et al.

(10) Patent No.: US 10,641,718 B2
(45) Date of Patent: May 5, 2020

(54) X-RAY FLUORESCENCE ANALYZER

(71) Applicant: Bruker AXS Handheld, Inc., Kennewick, WA (US)

(72) Inventors: Brian Scott Parks, Kennewick, WA (US); Robert Matthew Burton, West Richland, WA (US); Robert Francis Shannon, Jr., Richland, WA (US); Jiyan Gu, Seattle, WA (US); Lance Thompson Doyle, Walla Walla, WA (US); Fredericus Vosman, Richland, WA (US); Kenneth Dean Wheeler, Spokane, WA (US); Michael Scott Kirsch, Richland, WA (US)

(73) Assignee: Bruker Handheld LLC, Kennewick, WA (US)

( * ) Notice: Subject to any disclaimer, the term of this patent is extended or adjusted under 35 U.S.C. 154(b) by 321 days.

(21) Appl. No.: 15/661,201

(22) Filed: Jul. 27, 2017

(65) Prior Publication Data

US 2018/0031497 A1     Feb. 1, 2018

Related U.S. Application Data

(60) Provisional application No. 62/368,256, filed on Jul. 29, 2016.

(51) Int. Cl.
*G01N 23/223* (2006.01)
*G02B 27/01* (2006.01)
*G06F 3/0484* (2013.01)

(52) U.S. Cl.
CPC ..... *G01N 23/223* (2013.01); *G01N 2223/301* (2013.01); *G01N 2223/313* (2013.01);
(Continued)

(58) Field of Classification Search
CPC ........... G01N 23/223; G01N 2223/301; G01N 2223/313
See application file for complete search history.

(56) References Cited

U.S. PATENT DOCUMENTS 6,400,795 B2    6/2002  Yagi
6,486,573 B2    11/2002 Yagi et al.
(Continued)

FOREIGN PATENT DOCUMENTS

CN    102507625 A    6/2012
EP    2908127 A1     8/2015
(Continued)

OTHER PUBLICATIONS

Extended European Search Report, dated Feb. 20, 2018, for related EP patent application No. EP 17183698.4.
(Continued)

*Primary Examiner* — Hugh Maupin
(74) *Attorney, Agent, or Firm* — Armstrong Teasdale LLP

(57) ABSTRACT

A system and method for processing X-ray fluorescence data in a hand-held X-ray Fluorescence (XRF) analyzer are provided. The X-ray fluorescence (XRF) analyzer includes a radiation source assembly including a first centerline axis and configured to direct an X-ray beam to impinge on a sample to be tested. The XRF analyzer also includes a radiation detector assembly including a second centerline axis configured to sense X-ray fluorescence (XRF) emitted from the sample in response to the X-ray beam. The XRF analyzer further includes a processor configured to determine a property of the sample to be tested from the emitted XRF, and a proximity sensor configured to continuously measure a distance between the XRF analyzer and the
(Continued)

sample to be tested, the distance being at least one of displayed to a user and used by the processor to determine the property.

29 Claims, 13 Drawing Sheets

(52) U.S. Cl.
CPC ...... *G01N 2223/408* (2013.01); *G02B 27/017* (2013.01); *G06F 3/04842* (2013.01)

(56) References Cited

U.S. PATENT DOCUMENTS

| | | | |
|---|---|---|---|
| 6,535,573 | B2 | 3/2003 | Yagi |
| 6,542,349 | B2 | 4/2003 | Yagi |
| 6,765,986 | B2 | 7/2004 | Grodzins et al. |
| 7,020,238 | B1 | 3/2006 | Kantonen et al. |
| 7,409,037 | B2 | 8/2008 | Puusaari et al. |
| 7,443,959 | B2 | 10/2008 | Kantonen et al. |
| 9,291,583 | B2 | 3/2016 | Van Haarlem et al. |
| 9,310,324 | B2 | 4/2016 | Jarvikivi et al. |
| 2004/0109534 | A1 | 6/2004 | Uehara et al. |
| 2008/0192897 | A1* | 8/2008 | Piorek .................. G01N 23/223 378/98.8 |
| 2008/0267348 | A1 | 10/2008 | Puusaari et al. |
| 2009/0057422 | A1 | 3/2009 | Dugas et al. |
| 2009/0274268 | A1* | 11/2009 | Grodzins ................ A61B 6/482 378/45 |
| 2012/0057741 | A1* | 3/2012 | Macklin .................. G01N 1/02 382/100 |
| 2014/0157610 | A1* | 6/2014 | Garvey .................. G01B 21/04 33/503 |
| 2015/0204806 | A1* | 7/2015 | Mazor .................. G01N 23/223 378/46 |
| 2016/0078974 | A1 | 3/2016 | Jones |
| 2017/0011973 | A1* | 1/2017 | Tingay .................. G01N 23/04 |
| 2017/0014868 | A1* | 1/2017 | Garcia, Jr. ............ B07C 5/3416 |
| 2017/0038319 | A1* | 2/2017 | Kumar .................. G01N 23/223 |

FOREIGN PATENT DOCUMENTS

| | | |
|---|---|---|
| KR | 20030041724 A | 5/2003 |
| WO | 2008136573 A1 | 11/2008 |

OTHER PUBLICATIONS

Partial EP Search Report, dated Oct. 18, 2017, for co-pending EP patent application No. EP 17183698.4 (12 pgs.).

* cited by examiner

X-RAY FLUORESCENCE ANALYZER

CROSS REFERENCE TO RELATED APPLICATIONS

This application claims priority to and the benefit of the filing date of U.S. Provisional Application No. 62/368,256 filed on Jul. 29, 2016, which is hereby incorporated by reference in its entirety.

BACKGROUND

This disclosure relates generally to X-ray fluorescence analyzers and, more particularly, to portable X-ray fluorescence analyzers.

XRF analyzers are used to detect elements present in a sample. A typical XRF analyzer includes an X-ray source for directing X-rays to the sample and a detector responsive to the X-rays emitted from the sample. An analyzer processes the output signals produced by the detector and divides the energy levels of the detected X-ray photons into several energy subranges by counts of the number of X-ray photons detected to produce a graph depicting the X-ray spectrum of the sample.

Using an XRF analyzer, an operator can detect whether certain elements are present in sample for use in such applications as, inter alia, security and law enforcement, environmental applications, artistic and historic works, biomedical and pharmaceutical applications, process chemistry, and the like.

Filtering of particular ranges of X-rays permits more specific ranges of materials to be identified, better quantification accuracies, and lower levels of detection. The amount of different filter choices in a typical XRF analyzer is limited because of the size of the analyzer and the construction of the analyzer. Such limited filter choices limits the different materials that the analyzer can accurately measure.

Many XRF analyzers suffer from the deleterious effects of Bragg reflection, a known phenomenon characterized by constructive X-ray reflection peaks. Such reflections cannot reliably be filtered and cannot accurately be compensated for in an analysis algorithm. Bragg reflections may give indications of incorrect relative concentrations of elements within the sample being tested.

During testing procedures using XRF analyzers, many other sensing devices and/or devices supporting the XRF analysis are inconveniently positioned and supported indirectly from the XRF analyzer. In other words, for each modification of the position of the XRF analyzer, each auxiliary analyzer or support device must be repositioned, as well, which is time-consuming and may affect accuracy of the measurement.

Many testing procedures do not permit touching of the sample to be tested by the analyzer. For example, historical or artistic artifacts may be damaged or otherwise be affected to touching the surface of the artifact with the analyzer faceplate or standoff device.

At least some known XRF analyzers are stand-alone devices that have little or no communications abilities with offboard components or are connected after data collection, to off board analysis equipment using a communications cable.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION

In one embodiment, X-ray fluorescence (XRF) analyzer includes a radiation source assembly including a first centerline axis and configured to direct an X-ray beam to impinge on a sample to be tested. The XRF analyzer also includes a radiation detector assembly including a second centerline axis configured to sense X-ray fluorescence (XRF) emitted from the sample in response to the X-ray beam. The XRF analyzer further includes a processor configured to determine a property of the sample to be tested from the emitted XRF, and a proximity sensor configured to continuously measure a distance between the XRF analyzer and the sample to be tested, the distance being at least one of displayed to a user and used by the processor to determine the property.

In another embodiment, a method for processing X-ray fluorescence data in an X-ray Fluorescence (XRF) analyzer that includes a computer device coupled to a memory device includes receiving, by the computer device, X-ray fluorescence data from an X-ray detector device, generating X-ray fluorescence spectrum data using the received X-ray fluorescence data, receiving, by the computer device, distance data relative to a distance between the XRF analyzer and a sample, and determining an elemental composition of the sample using the generated X-ray fluorescence spectrum data and the distance data.

In yet another embodiment, one or more non-transitory computer-readable storage media has computer-executable instructions embodied thereon, wherein when executed by at least one processor, the computer-executable instructions cause the processor to select a first filter of the plurality of individually selectable filters, indicate, to the at least one processor, the filter selected. The computer-executable instructions cause the processor to select one of the first filter-in position and the second no-filter position on the separate manual filter assembly and emit radiation through the selected filter and the separate manual filter assembly. The computer-executable instructions cause the processor to receive, by the at least one processor, X-ray fluorescence data from an X-ray detector device, generate X-ray fluorescence spectrum data using the received X-ray fluorescence data, receive, by the computer device, distance data relative to a distance between the XRF analyzer and a sample, and determine an elemental composition of the sample using the generated X-ray fluorescence spectrum data and the distance data. The computer-executable instructions cause the processor to transmit raw spectrum data to the visual display in real-time, receive a user selection from an input device associated with the visual display, and modify the raw spectrum data based on the received input.

BRIEF DESCRIPTION OF THE DRAWINGS

FIG. 1 is a functional illustration of the general components of a radiation assembly, for example, but not limited to, an X-ray fluorescence (XRF) spectrometer.

FIG. 2 is a block data flow diagram of the radiation assembly shown in FIG. 1 in accordance with an exemplary embodiment of the present disclosure.

FIG. 3 is a perspective view of the XRF spectrometer shown in FIG. 1 embodied in a portable hand-held format.

FIG. 4 is a view of a display screen used with the control and display section shown in FIG. 3.

FIG. 5 is a forward elevation view of the nose section shown in FIG. 3 illustrating the access door also shown in FIG. 3 being open.

FIG. 6 is a block diagram of a filter wheel that may be used with the filter wheel assembly of the XRF spectrometer shown in FIG. 1.

FIG. 7 is a side elevation view of the XRF spectrometer shown in FIG. 1 in accordance with an example embodiment of the present disclosure.

FIG. 8 is a cutaway view of an instrument front end of the XRF spectrometer shown in FIG. 1.

FIG. 9 is a view of the instrument front end shown in FIG. 8 taken along line 9-9 also shown in FIG. 8.

FIG. 10 is an exploded view of the collimator assembly and the filter assembly both shown in FIG. 5 that may be used with the XRF spectrometer shown in FIG. 1.

FIG. 11 is another cutaway view of the instrument front end shown in FIG. 8.

FIG. 12 is a perspective view of the grid structure shown in FIG. 11.

FIG. 13 is a flow chart of a method of processing X-ray fluorescence data in a hand-held X-ray Fluorescence (XRF) analyzer.

DETAILED DESCRIPTION

Figure 1:
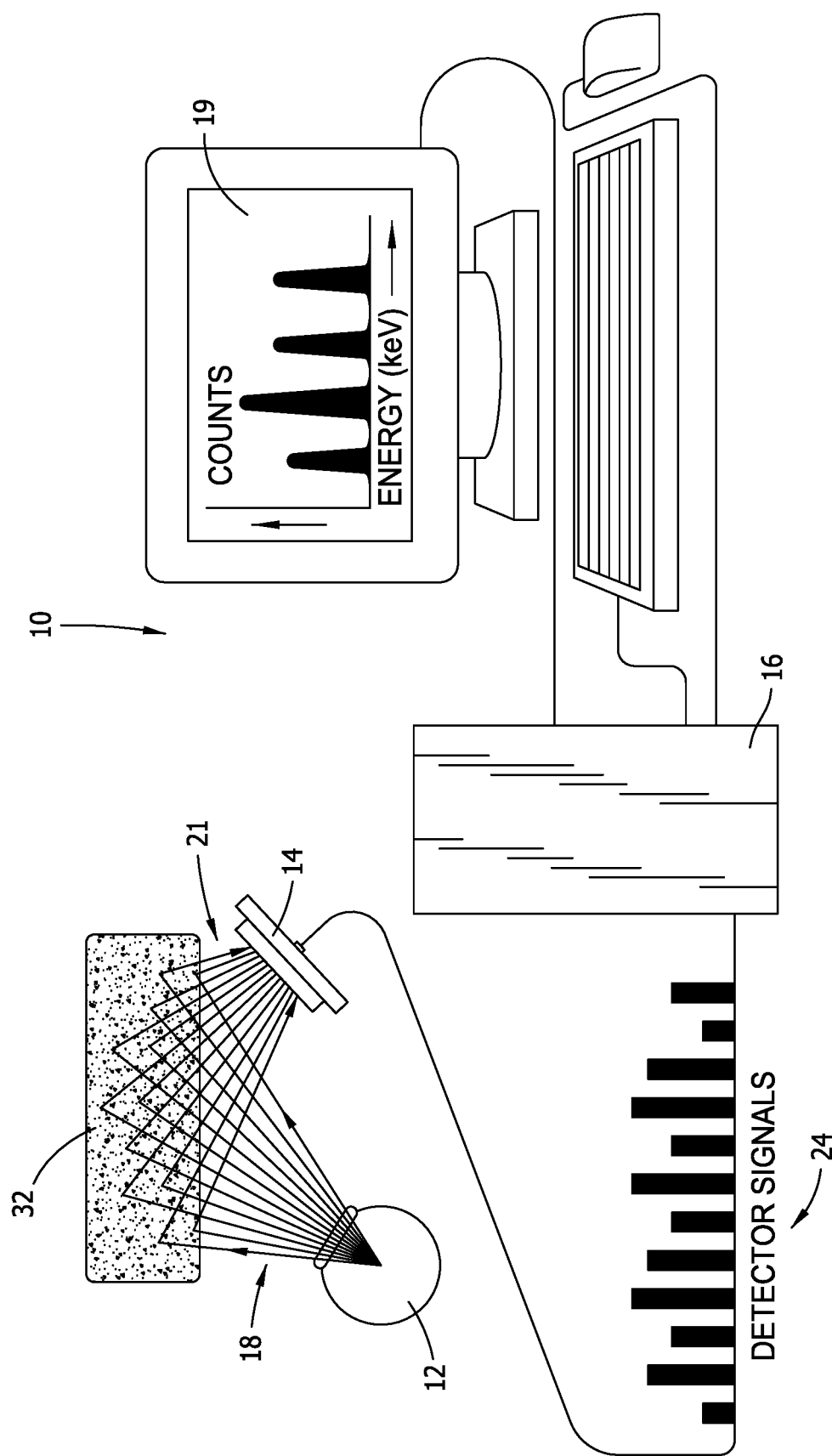
FIGS. 1-13 show example embodiments of the methods and systems described herein.

Embodiments of the present disclosure describe a configurable X-ray Fluorescence (XRF) spectrometer that includes detection hardware, a plurality of accessories and attachments, and an accompanying software suite that permits real-time access to a raw spectrum of XRF data to the operator. The described XRF spectrometer includes customizable X-ray flux and detector parameters that permits precise calibrations targeting unique detection applications, enhanced minimum backscatter sample detection, and infrared sample detection. The XRF spectrometer may be embodied in a hand-held, counter-top, or bench-top enclosures.

The XRF spectrometer includes a unique analytical geometry optimized for reduced Bragg or constructive X-ray reflection peaks. A rail mounting feature, (Picatinny (AKA MIL-STD-1913 (AR)) is configured to interface with and support a tripod boom and other articulating devices and auxiliary instruments configured to enhance the data collected by the XRF spectrometer or supplement the data collected by the XRF spectrometer with data of a different kind or character. The XRF spectrometer includes removable and customizable beam-hardening filters combined with a selectable multi-position filter wheel assembly and selectable collimation objective masks. An optional vacuum pump and helium purge permits boosting light-element (low atomic number sample) signals. A distance measuring proximity sensor is used for precise instrument to sample distance measurement during detection and feedback for analysis.

Various interchangeable detector sizes are available in different ranges, for example, detectors having active areas with diameters of 7, 20, 30, 50 $mm^2$ may be preselected and then assembled with the XRF spectrometer. In other embodiments, other diameter detectors may be included with the XRF spectrometer. A full color video camera is used for sample alignment and reporting of results. The XRF spectrometer may be used with an external computer or may operate as a stand-alone device and may also be used with a desktop stand, countertop stand, and exam table for analysis of small samples. A benchtop stand may be used for irregularly-shaped samples and higher power applications. The XRF spectrometer provides control over a wide range of accelerating voltages and anode currents. Command and control of the XRF spectrometer is provided via Universal Service Bus (USB), Bluetooth®, other wireless protocols, and via wired remote in addition to the on instrument display and touchscreen. The XRF spectrometer also includes support for Wi-Fi data transfer and setup. The XRF spectrometer includes wireless connectivity for connecting to wearable viewing systems, such as, but not limited to. Occulus®, Google Glass and other augmented reality (AR) devices, and tablets, laptops, cell phones and the like. The XRF spectrometer includes an onboard touchscreen graphical user interface (GUI) and a pistol grip for hand-held operation. High-visibility warnings and indicators alert the operator to conditions that may affect detection or accuracy, or user safety. The XRF spectrometer is configured to receive either onboard battery power, external DC power, and/or alternating current (AC) power.

The X-ray fluorescence (XRF) analyzer or spectrometer introduced above and described in detail below includes a radiation source assembly having a first centerline axis and is configured to direct a beam of radiation, typically an X-ray beam in the direction of the first centerline axis to impinge on a sample to be tested. The XRF analyzer also includes a radiation detector assembly having a second centerline axis. The radiation detector assembly is configured to sense X-ray fluorescence (XRF) emitted from the sample in response to the X-ray beam. A processor is configured to determine a property of the sample to be tested from the emitted XRF and a proximity sensor is configured to continuously measure a distance between the a surface of the XRF analyzer, which is typically a part of a front face of the XRF analyzer, and the sample to be tested. The distance is displayed to a user and/or used by the processor to facilitate determining the property.

The XRF analyzer may also include a plurality of proximity sensors and may be configured to determine a positional orientation of the XRF analyzer with respect to the sample to be tested using the plurality of proximity sensors. The first centerline axis and the second centerline axis may be offset laterally with respect to each other by a first angle. The first angle may be selected to facilitate reducing Bragg reflections. In some embodiments, the first angle is less than 30°. In one embodiment, the first angle is approximately 10°. A projection of the first centerline axis on a plane and a projection of the second centerline axis on the plane may intersect to form a second angle, which may be selectively variable to modify a position of an intersection of the projection of the first centerline axis and the projection of the second centerline axis on the plane. The second angle may also be selected to facilitate reducing Bragg reflections and may be selected to be less than 90°. In one embodiment, the second angle equals approximately 70°.

In various embodiments, the XRF analyzer may include a Near Field Communications (NFC) reader/writer configured to sense a presence or absence of predetermined accessories. The NFC reader/writer may be configured to sense at least one of a position and an orientation of the XRF analyzer and prevent operation of the radiation source assembly when the position and an orientation of the XRF analyzer are outside a predetermined range or a determined range. The NFC reader/writer may be configured to sense when the XRF analyzer may be installed in an accessory and to at least one of permit and prevent activation of predetermined operational features or modes based on the installation.

A method of processing X-ray fluorescence data in a hand-held X-ray Fluorescence (XRF) analyzer is also described in detail below. In various embodiments, the method is implemented using a computer device coupled to a memory device. The method includes steps, such as, receiving, by the computer device, X-ray fluorescence data from an X-ray detector device, generating X-ray fluorescence spectrum data using the received X-ray fluorescence data, receiving, by the computer device, distance data relative to a distance between the XRF analyzer and a sample, and determining an elemental composition of the sample using the generated X-ray fluorescence spectrum data and the received distance data. The method may further include emitting a beam of X-rays from a radiation source assembly positioned onboard the XRF analyzer. The XRF analyzer may include a selectable filter assembly including a plurality of individually selectable filters in series with a separate manual filter assembly selectable between a first filter-in position and a second no-filter position. The method may also include selecting a first filter of the plurality of individually selectable filters, indicating, to the computer device, the filter selected, selecting one of the first filter-in position and the second no-filter position on the separate manual filter assembly, and emitting radiation through the selected filter and the separate manual filter assembly.

The XRF analyzer may include a visual display and the method may further include transmitting raw spectrum data to the visual display in real-time, receiving a user selection from an input device associated with the visual display, and modifying the raw spectrum data based on the received user selection. The XRF analyzer may include an instrument mounting rail coupled to the XRF analyzer and the method may further include receiving a signal from an instrument mounted on the instrument mounting rail. The method may further include receiving X-ray photons emitted from a sample through a faceplate window by an X-ray detector device and receiving a live video image through the faceplate window from an integrated video camera. The method may also include transceiving wirelessly, augmented reality data between the XRF analyzer and an augmented reality device wearable by a user and communicatively coupled to the XRF analyzer. As used herein, augmented reality (AR) is a live direct or indirect view of a physical, real-world environment whose elements are augmented by computer-generated sensory input such as sound, video, graphics or GPS data. Hardware components used for AR may include a processor, a display screen, sensors, input devices, a camera, and MEMS sensors, such as, an accelerometer, GPS, and a solid state compass.

Also described in detail below is non-transitory computer-readable storage media having computer-executable instructions embodied thereon. When executed by a processor of the XRF analyzer, the computer-executable instructions cause the processor to select a first filter of a plurality of individually selectable filters and to indicate to the at least one processor, the filter selected. The instructions may also cause the processor to select one of a first filter-in position and a second no-filter position on a separate manual filter assembly, emit radiation from a radiation source assembly through the selected filter and the separate manual filter assembly, receive, by the at least one processor, X-ray fluorescence data from an X-ray detector device of the XRF analyzer, and generate X-ray fluorescence spectrum data using the received X-ray fluorescence data. The instructions may also cause the processor to receive, by the at least one processor, distance data relative to a distance between the XRF analyzer and a sample and to determine an elemental composition of the sample using the generated X-ray fluorescence spectrum data and the distance data. The instructions may further cause the processor to transmit raw spectrum data to a visual display in real-time, receive a user selection from an input device associated with the visual display, and modify the raw spectrum data based on the received user selection.

The computer-executable instructions may further cause the processor to receive a signal from an instrument mounted on an instrument mounting rail coupled to the XRF analyzer, receive a live video image through a window of the XRF analyzer from an integrated video camera, and transceive wirelessly, augmented reality data between the XRF analyzer and an augmented reality device wearable by a user and communicatively coupled to the XRF analyzer.

In one embodiment, a computer program is provided, and the program is embodied on a computer readable medium. In an example embodiment, the system is executed on a single computer system, without requiring a connection to a sever computer. In other embodiments, the operating system can be one of the Microsoft Windows™ family of operating systems (e.g., Windows 2000, Windows XP, Windows XP x64 Edition, Windows Vista, Widows 7, Windows 8, Windows CE, Windows Mobile), Linux®, HP-UX®, UNIX®, Sun OS, Solaris, Mac OS X, Alpha OS, AIX, IRIX32, IRIX64, iOS™, Android™ etc. Other operating systems may be used. Microsoft Windows is a trademark of Microsoft Corporation. Android is a trademark of Google Inc. IOS is a trademark or registered trademark of Apple, SunOS and Solar are trademarks or registered trademarks of Cisco. The registered trademark Linux® is used pursuant to a sublicense from LMI, the exclusive licensee of Linus Torvalds, owner of the mark on a world-wide basis. UNIX® and HP-UX® are registered trademarks of Hewlett-Packard Company. The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, real-time refers to outcomes occurring at a substantially short time period after a change in the inputs affecting the outcome, for example, receiving fluorescence data, calculating a spectrum and making the calculated spectrum available for display, transmission or further processing. The period may be the amount of time between each iteration of a regularly repeated task or between one task and another. The time period is a result of design parameters of the real-time system that may be selected based on the importance of the outcome and/or the capability of the system implementing processing of the inputs to generate the outcome. Additionally, events occurring in real-time occur without substantial intentional delay.

FIG. 1 is a functional illustration of the general components of a radiation assembly 10, for example, but not limited to, an X-ray fluorescence (XRF) spectrometer. Although depicted in the form of a desktop XRF spectrometer, all components illustrated maybe embodied in a portable hand-held device with analogous and/or complementary components, as will be described later. The XRF spectrometer/analyzer may also be embodied in a ruggedized form factor suitable for harsh or industrial environments. XRF spectrometers detect secondary radiation emitted from a sample of material that has been excited by radiation applied to the sample material by the spectrometer. A wavelength distribution of the emitted radiation is characteristic of the elements present in the sample, while the intensity distribution gives information about the relative abundance of the elements in the sample. By means of a spectrum obtained in this manner, a user typically is able to determine the elemental components of the sample, and quantitative proportions of those elemental components within the examined test sample. In the illustrated embodiment, radiation assembly 10 includes a radiation source assembly 12, a radiation detector assembly 14, an analyzer 16, and a display 19. Radiation source assembly 12 may include an X-ray tube that projects a primary beam 18 of, for example, but not limited to, X-rays towards a sample 32 that is to be tested. In another exemplary embodiment, radiation source assembly 12 is a radioactive isotope, which projects a primary beam of gamma rays toward the sample 32. In yet another exemplary embodiment, radiation source assembly 12 is an electron beam source that projects a primary beam of electrons towards the sample 32. Any suitable radiation source or plurality of sources that allow radiation assembly 10 to function as described herein may be used as radiation source assembly 12.

Sample 32 becomes excited after being exposed to primary beam 18. This excitation causes sample 32 to emit a secondary (i.e., characteristic or fluorescent) radiation 21. Secondary radiation 21 is collected by radiation detector assembly 14. Radiation detector assembly 14 includes electronic circuitry, which is sometimes referred to as a preamplifier, that converts collected secondary radiation to a detector signal 24 (i.e., a voltage signal or an electronic signal) and provides the detector signal 24 to analyzer 16. In at least one embodiment, analyzer 16 includes a digital pulse processor or multi-channel analyzer.

Figure 2:
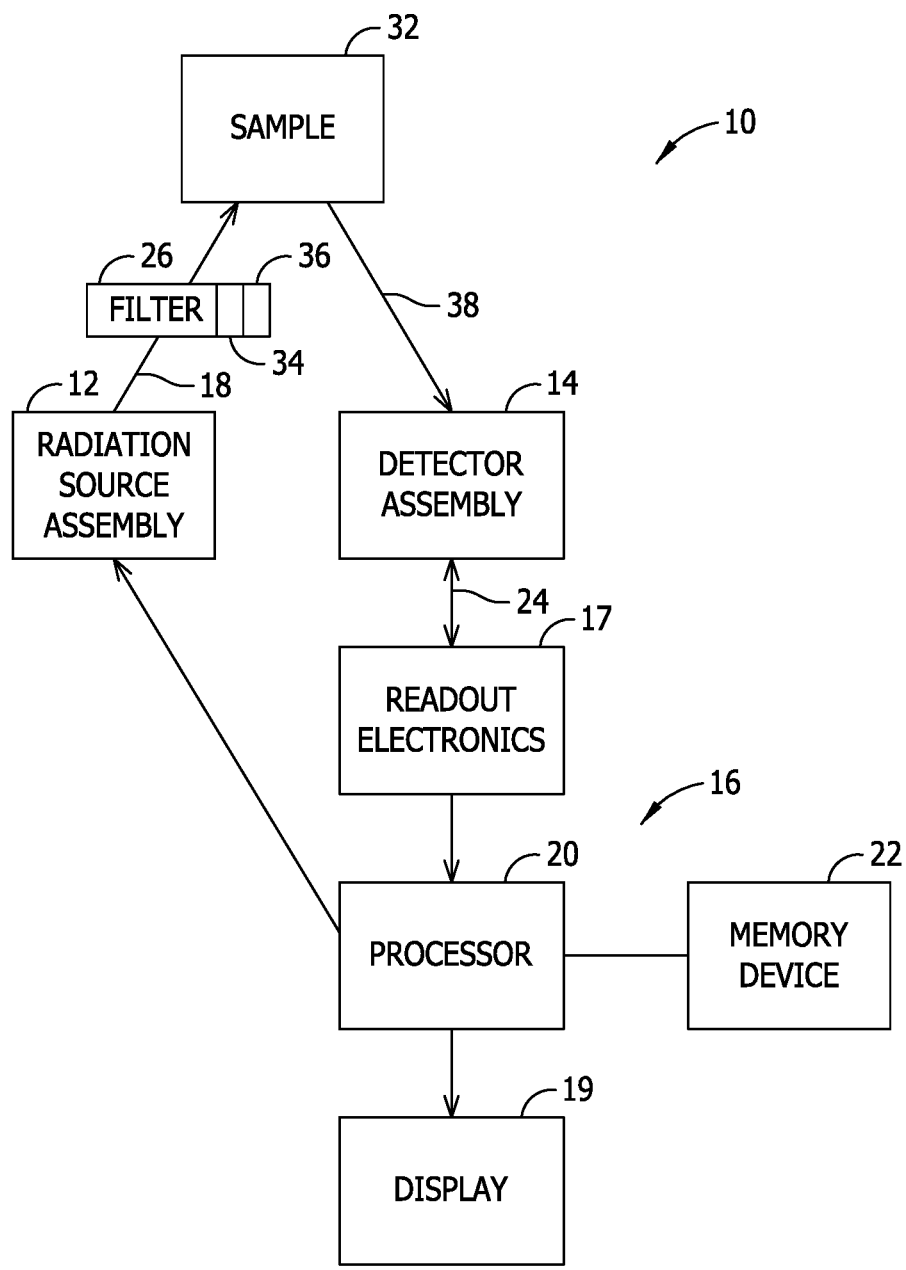

FIG. 2 is a block data flow diagram of radiation assembly 10 in accordance with an exemplary embodiment of the present disclosure. In the exemplary embodiment, radiation assembly 10 includes radiation source assembly 12, radiation detector assembly 14, and analyzer 16, which in the exemplary embodiment includes a readout electronics 17, a processor 20, and a memory device 22. Radiation assembly 10 may also include a display 19 and/or a filter wheel assembly 26.

The terms processor or processing device, as used herein, refer to central processing units, microprocessors, microcontrollers, reduced instruction set circuits (RISC), application specific integrated circuits (ASIC), logic circuits, and any other circuit or processor capable of executing the functions described herein.

It should be noted that embodiments of the disclosure are not limited to any particular processor for performing the processing tasks of embodiments of the disclosed analyzer. The terms "processor" or "processing device," as those terms are used herein, is intended to denote any machine capable of performing the calculations, or computations, necessary to perform the tasks of the disclosed analyzer. The terms "processor" or "processing device" also are intended to denote any machine that is capable of accepting a structured input and of processing the input in accordance with prescribed rules to produce an output. It should also be noted that the phrase "configured to" as used herein means that the processor is equipped with a combination of hardware and software for performing the tasks of embodiments of the disclosed analyzer, as will be understood by those skilled in the art.

Moreover, aspects of the disclosure transform a general-purpose computer into a special-purpose computing device when configured to execute the instructions described herein.

In the exemplary embodiment, radiation source assembly 12 is a radiation source that projects a primary beam of radiation toward a sample 32 that is selected to be analyzed. For example, radiation source assembly 12 may include an X-ray tube that projects primary beam 18 of X-rays toward sample 32. In an alternative embodiment, radiation source assembly 12 is a radioactive isotope, which projects a primary beam of gamma rays toward sample 32. In yet another alternative embodiment, radiation source assembly 12 is an electron beam source that projects a primary beam of electrons towards the sample 32. Any suitable beam source or plurality of sources, known in the art can be used as radiation source assembly 12. As used herein, sample 32 includes irregular-shaped objects, relatively small objects, such as, but not limited to powders, particulates, and shavings, and objects that include protrusions and pointed extensions.

In the exemplary embodiment, filter wheel assembly 26 is positioned between radiation source assembly 12 and sample 32. For example, filter wheel assembly 26 may include one or more selectable filters communicatively coupled to processor 20. Processor 20 may be configured to select one or more of a plurality of filters that may be applied by filter wheel assembly 26. Processor 20 may also be configured to select that no filter be applied to primary beam 18. More specifically, filter wheel assembly 26 may include a first filter 34 that modifies characteristics of primary beam 18 in a first manner and a second filter 36 that modifies characteristics of primary beam 18 in a second manner. Examples of materials included within first filter 34 and/or second filter 36 include, but are not limited to, copper, aluminum, and titanium. Although described as including two filters, filter wheel assembly 26 may include any number of filters that allows radiation assembly 10 to function as described herein.

Sample 32 becomes excited after being exposed to primary beam 18. This excitation causes sample 32 to emit secondary (i.e. characteristic fluorescent) radiation 21. Secondary radiation 21 is impinged upon radiation detector assembly 14. Radiation detector assembly 14 converts the secondary radiation to a detector signal 24, for example, a voltage signal or an electronic signal that is representative of the secondary radiation. Radiation detector assembly 14 provides detector signal 24 to readout electronics 17, which determine an energy spectrum of collected secondary radiation 21. Readout electronics 17 provide this energy spectrum to processor 20. Although described herein as radiation detector assembly 14 providing detector signal 24 to readout electronics 17 and readout electronics 17 providing the energy spectrum to processor 20, it is contemplated that readout electronics 17 and/or processor 20 may take action to receive detector signal 24 and/or the energy spectrum (e.g., may perform polling or a retrieve function in order to receive the signal and/or spectrum). Processor 20 determines the unique elemental composition of the sample. Processor 20 may also be referred to as an analyzer and may include a digital pulse processor.

Display 19 allows an operator to view results provided to display 19 by processor 20, for example, an operator may view the energy spectrum or a derived elemental composition and a final analytical result, such as an alloy identification of sample 32. Display 19 may be built into a handheld enclosure or it may be in the form of a small hand-held computer or personal digital assistant (PDA) that is communicatively coupled to processor 20 or it may be a general purpose computer of any size or configuration.

In the exemplary embodiment, radiation assembly 10 determines measurement conditions to be applied during an analysis of a sample, for example, sample 32. As described above, processor 20 controls operation of radiation assembly 10, and more specifically, controls operation of radiation source assembly 12. In the exemplary embodiment, processor 20 operates radiation source assembly 12 in accordance with at least one predefined measurement condition to perform a first elemental analysis of sample 32. For example, processor 20 may be configured to operate radiation source assembly 12 in accordance with a first measurement condition or a first set of measurement conditions. The measurement condition includes, but is not limited to, a length of time the measurement is taken, a level of voltage applied to radiation source assembly 12, a level of current applied to radiation source assembly 12, and/or a type of filter used. In the exemplary embodiment, a first predefined level of voltage is applied to radiation source assembly 12 for a first predefined length of time to perform the first elemental analysis of sample 32.

The first elemental analysis may also be referred to as an initial analysis of sample 32 that provides an initial determination of an alloy grade of sample 32. The first elemental analysis is not stringent enough to determine, to a predefined level of certainty, that sample 32 is composed of the initial determination of the alloy grade. The first set of measurement conditions may be stored in a storage or memory device, for example, memory device 22. In a specific example, an aluminum/titanium (Al/Ti) filter is positioned between sample 32 and radiation detector assembly 14, and power having 40 kV and 10 microamps is applied to radiation source assembly 12 for five seconds.

A second elemental analysis may also be referred to as a phase two analysis. In a phase two analysis example, the empty filter wheel position is selected, the manual filter holder is empty and power having 15 kV and 15 microamps is applied to radiation source assembly 12 for up to 60 seconds. Additional phases may be used to allow detection of low concentrations of lower energy elements such as sulfur without the presence of ubiquitous high energy elements such as iron flooding the spectrum or to allow examining specific regions of the spectra with higher accuracy.

Figure 3:
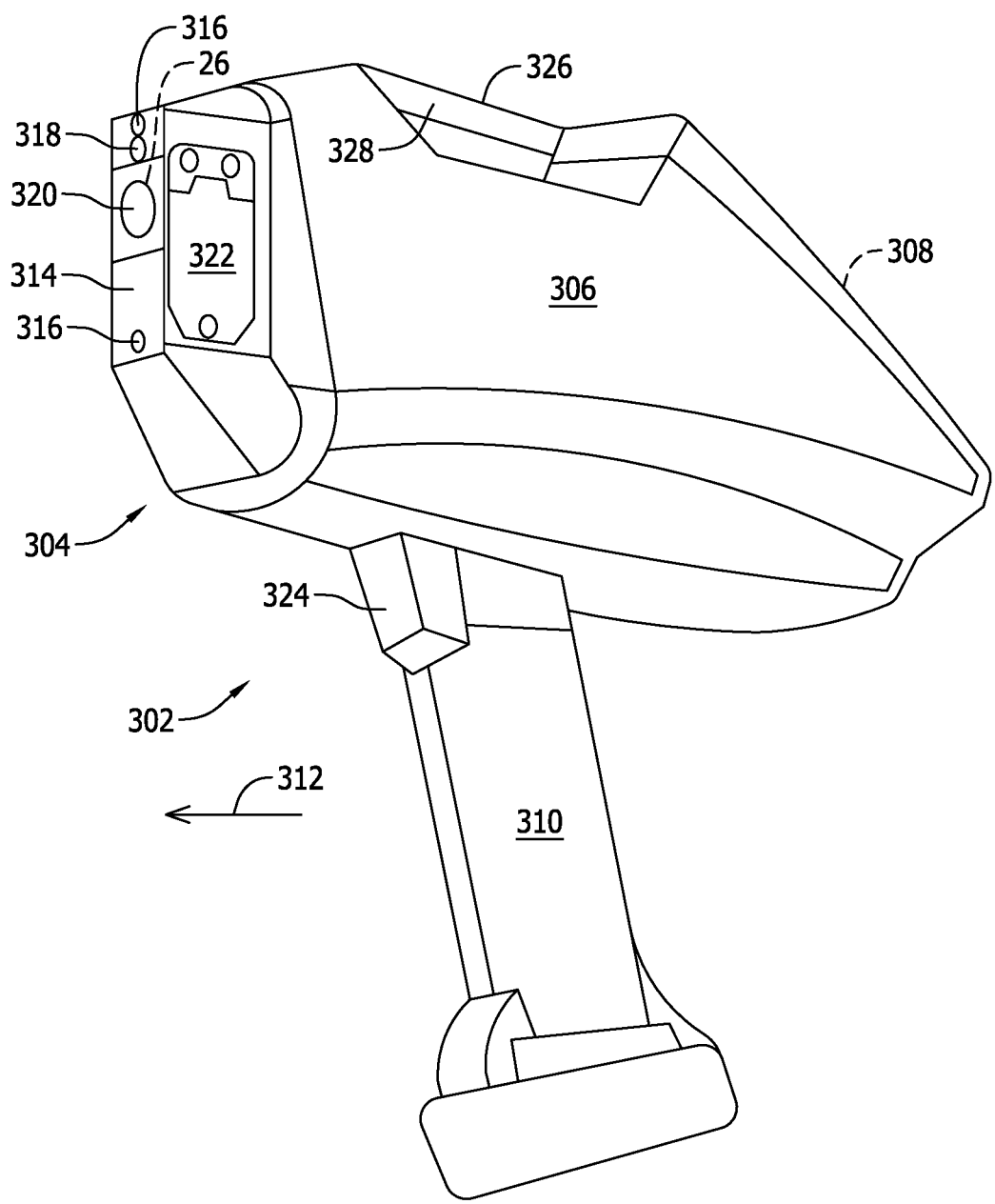

FIG. 3 is a perspective view of radiation assembly 10 embodied in a portable hand-held format. In the example embodiment, radiation assembly 10 is contained within a pistol-grip housing 302 that includes a nose section 304, a body 306, a control and display section 308, and a grip 310.

Nose section 304 extends away from body 306 in a forward direction 312 that is generally towards the sample to be tested (not shown). A faceplate 314 covers the most forward extent of nose section 304. Faceplate 314 is removably coupled to nose section 304 using one or more fasteners 316, such as, but not limited to screws. In the example embodiment, faceplate 314 includes a first proximity opening 318 configured to permit sensing a proximity of faceplate 314 to, for example, the sample to be tested. First proximity opening 318 permits emission of signals from a proximity sensor (not shown in FIG. 3) positioned behind faceplate 314 towards the sample to be tested. Nose section 304 also includes a second opening 320 configured to permit passage of radiation from radiation source assembly 12 (shown in FIGS. 1 and 2), secondary radiation from the sample to be tested (not shown), and visible, near infrared, and infrared wavelength electromagnetic radiation for reception by an integrated video camera (not shown in FIG. 3) positioned within nose section 304. The integrated video camera provides visualization and accurate positioning of the measurement spot. Filter wheel assembly 26 (shown in FIG. 2) is also located behind faceplate 314.

Body 306 contains analyzer 16 (shown in FIG. 1), power supplies (not shown in FIG. 3), and other auxiliary components described in detail below. Control and display section 308 is coupled to or forms a part of body 306. Grip 310 provides a hand hold support for radiation assembly 10 and may include a trigger control 324 and an internal battery (not shown in FIG. 3). An instrument mounting rail 326, for example, a rail known as a Picatinny (AKA MIL-STD-1913 (AR)) rail or a weaver rail is positioned along a top surface 328 of body 306.

Figure 4:
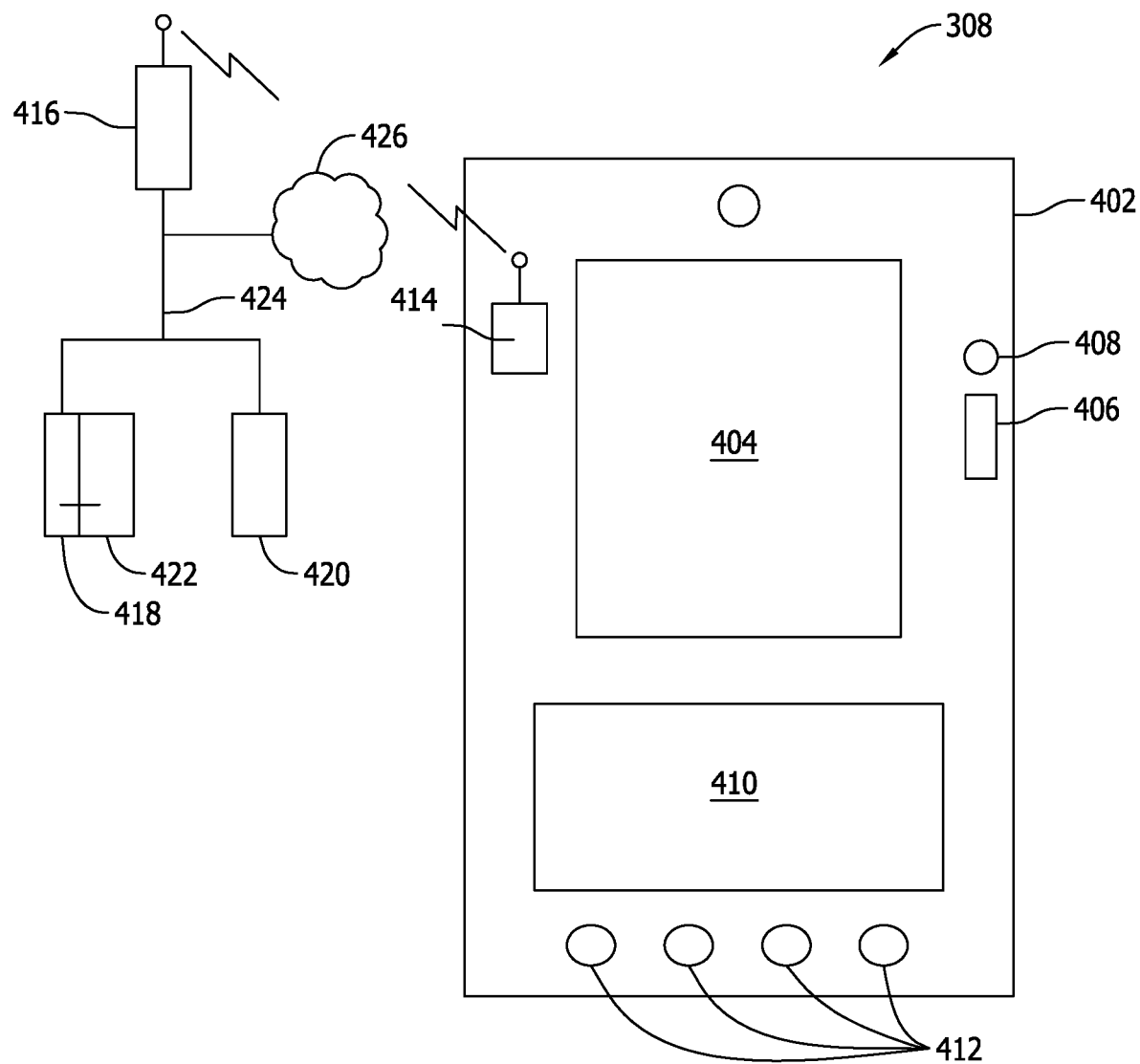

FIG. 4 is a view of a display screen 402 used with control and display section 308 (shown in FIG. 3). In the example embodiment, control and display section 308 includes at least one media output component 404 for presenting information to a user. Media output component 404 is embodied in any component capable of conveying information to the user. In some embodiments, media output component 404 includes an output adapter such as a video adapter 406 and/or an audio adapter 408. The output adapter is operatively coupled to processor 20 (shown in FIG. 2) and operatively coupleable to an output device such as a display device, a liquid crystal display (LCD), organic light emitting diode (OLED) display, or "electronic ink" display, or an audio output device, a speaker or headphones.

In some embodiments, control and display section 308 includes an input device 410 for receiving a user selection from the user. Input device 410 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 404 and input device 410. Additional "hard" controls 412, such as, but not limited to, buttons, knobs and the like, may be positioned on control and display section 308 or may be located on another section of radiation assembly 10, for example, trigger control 324. Control and display section 308 may also include a communication interface 414, which is communicatively coupleable to a remote device such as a server system 416. Communication interface 414 may include, for example, a wired or wireless network adapter or a wireless data transceiver for use with a mobile phone network, Global System for Mobile communications (GSM), 3G, or other mobile data network or Worldwide Interoperability for Microwave Access (WIMAX). Server system 416 may further include other servers or may be communicatively coupled to other servers, such as, but not limited to a database server 418, a web server 420, and the like. A memory storage device 422 is coupled to database server 418. Servers 416, 418, and 420 are coupled in a local area network (LAN) 424, which is accessible to the Internet 426 including cloud computing resources.

Stored in memory storage device 422 are, for example, computer readable instructions for providing a user interface to the user via media output component 404 and, optionally, receiving and processing a user selection from input device 410. A client application executing on control and display section 308 permits the user to interact with a server application executing on server system 416, on one of the other servers in server system 416, for example, servers 418 and 420, or Internet 426.

Figure 5:
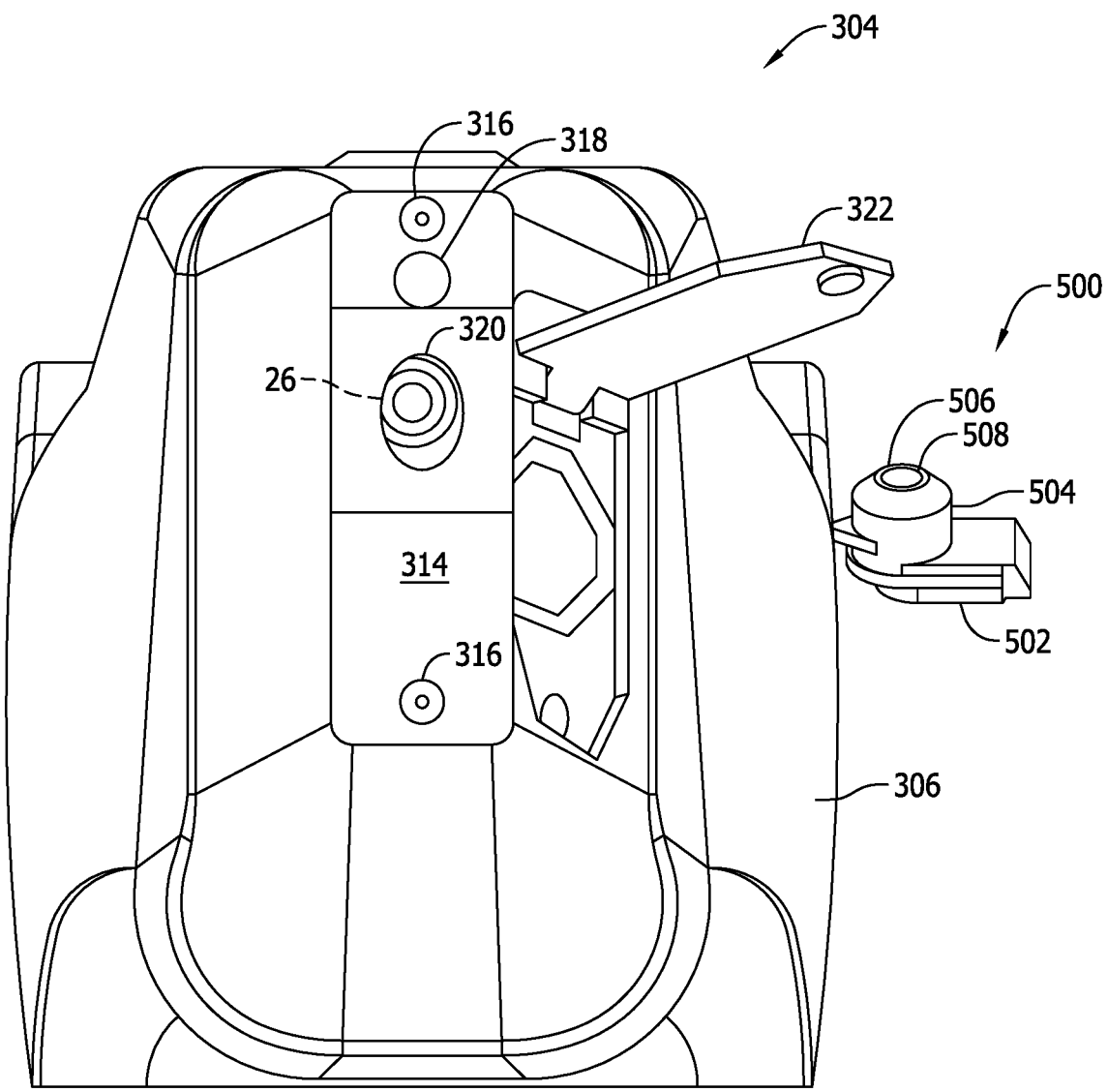

FIG. 5 is a forward elevation view of nose section 304 illustrating access door 322 being open. Access door 322 permits access to a collimator/manual filter holder assembly 500. A manual filter holder 502 may hold one of the standard filters supplied by a manufacturer or may contain the user fabricated filter described above. The manual filter may be used in conjunction with the blank position in filter wheel assembly 26 (shown in FIGS. 1 and 3) or in conjunction with one of the standard filters in filter wheel assembly 26. In some embodiments, a collimator assembly 504 includes a bore 506 having selectable diameter sleeves 508, which affect the spot size on the sample to be tested. Whereas the different filters are used to filter out different energy levels of X-rays, the different collimator diameters are used to vary the diameter of the analysis spot on the sample to be tested. For example, if the user wants to look at a very specific band of X-rays in the energy spectrum, the proper filter for that specific band of X-rays is selected, either manually by the user using control and display section 308 or by the control and display section 308 automatically. If the user has a special need for a particular band of X-rays that may not have a corresponding filter installed on filter wheel assembly 26, the user can fabricate a replaceable customizable manual filter, for example, by using a hand-held punch to punch out a filter from a sheet of a material or a plurality of materials that are determined to have the filtering characteristics needed to produce the specific band of X-rays desired.

Figure 6:
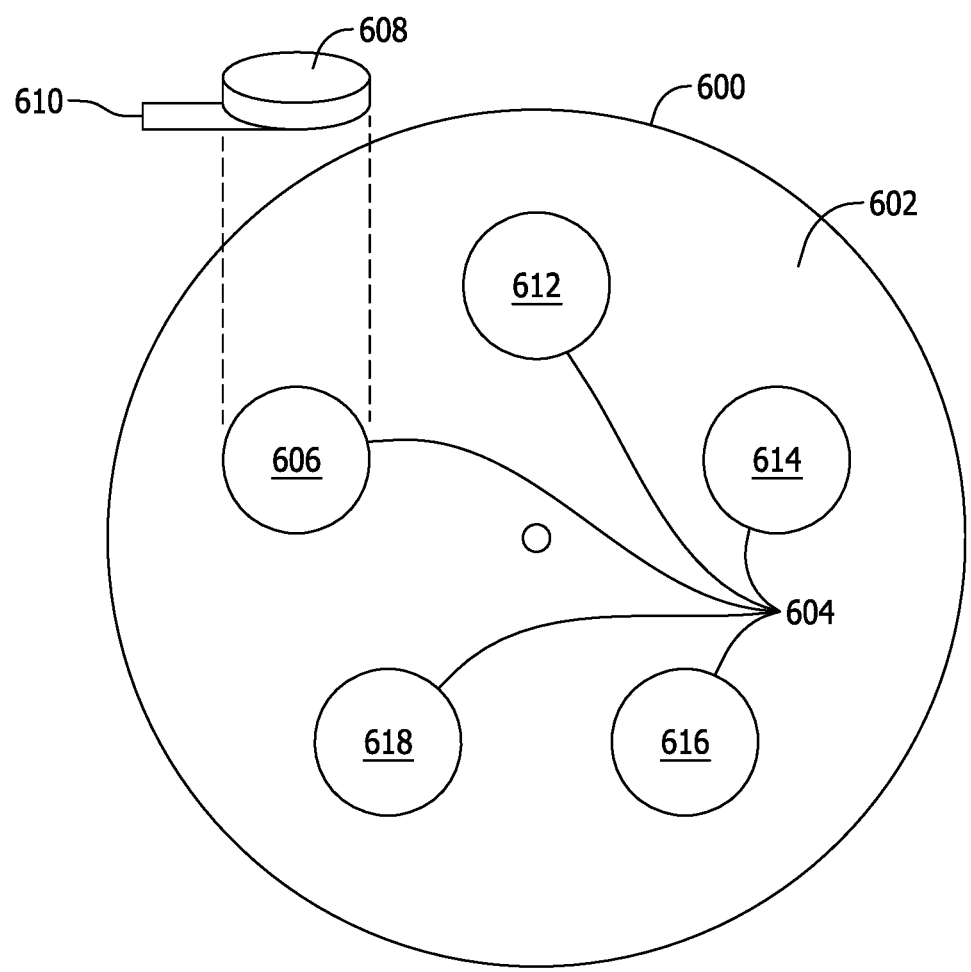

FIG. 6 is a block diagram of a filter wheel 600 that may be used with filter wheel assembly 26 of radiation assembly 10 (shown in FIG. 1). In the example embodiment, filter wheel 600 includes a circular body 602 that includes a plurality of filter positions 604 that each contains a different filter. Each filter may be defined by a material and a thickness of the respective filter. Additionally, one or more of filter positions 604 may contain more than one filter layer. A first filter position 606 may include a single layer 608 having a first thickness 610. Similarly, a second filter position 612 may include two separate filter layers positioned face-to face in second filter position 612. Each of the two separate filter layers may have respective layer thicknesses that can be the same thickness or different thicknesses with respect to each other. A third filter position 614 may include one or more filter layers configured to produce a different specific band of X-rays and a fourth filter position 616 may include one or more filter layers configured to produce another different specific band of X-rays. A fifth filter position 618 may include one or more filter layers selected and produced by the user to produce a different specific band of X-rays.

Figure 7:
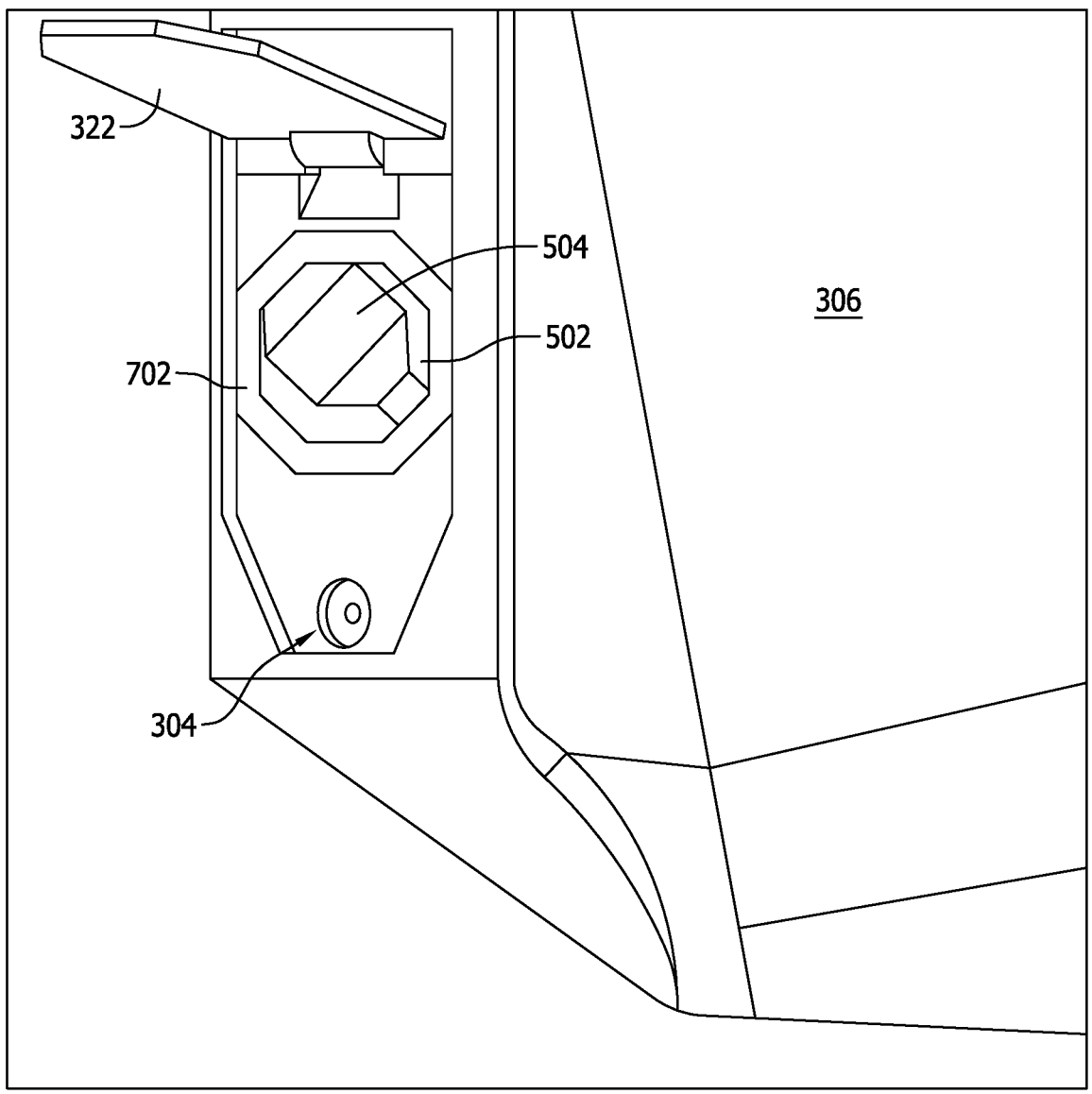

FIG. 7 is a side elevation view of radiation assembly 10 in accordance with an example embodiment of the present disclosure. In the example embodiment, nose section 304 includes a collimator and filter compartment 702 that contains and permits access to collimator assembly 504 and manual filter holder 502.

Figure 8:
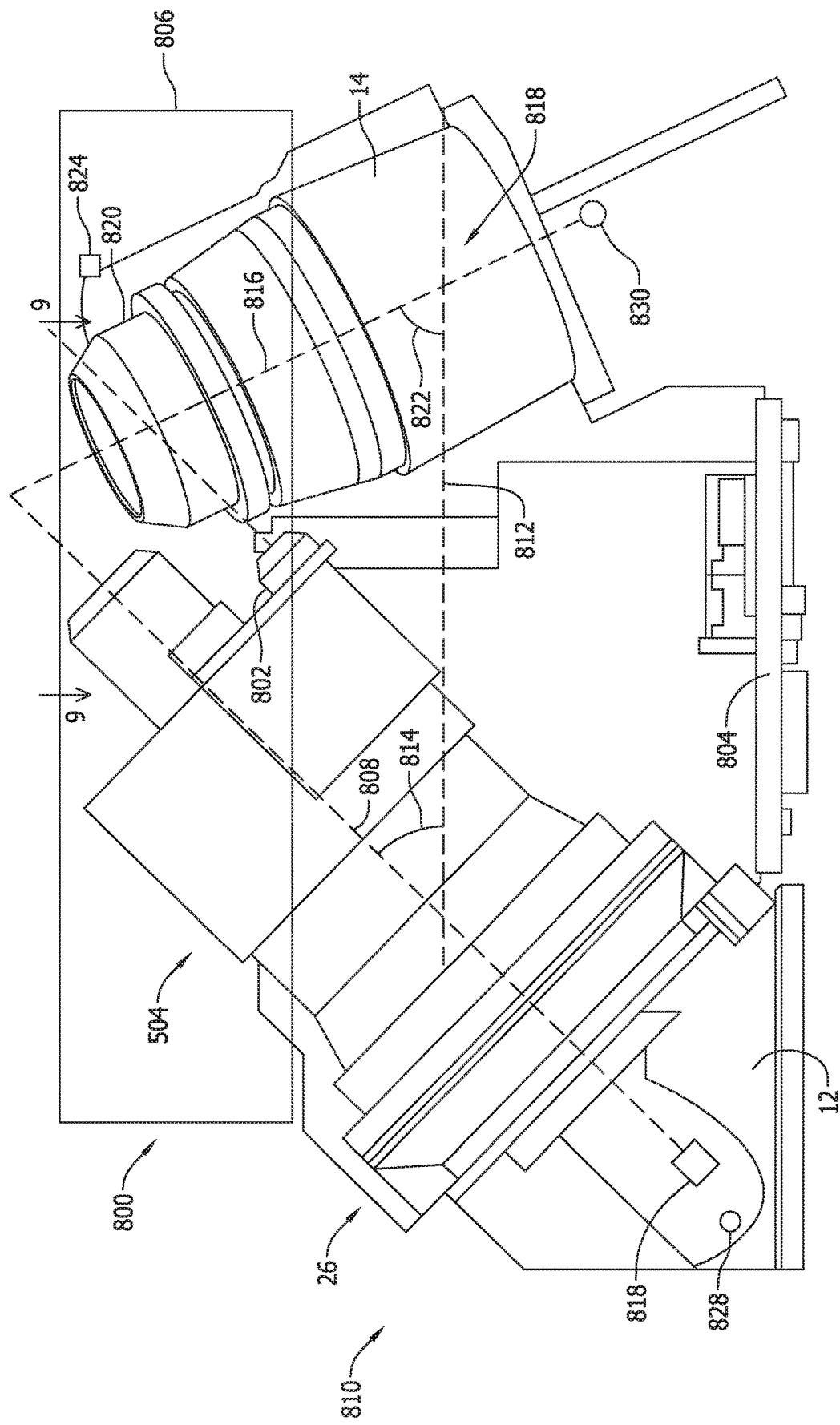

FIG. 8 is a cutaway view of an instrument front end 800 of radiation assembly 10. In the example embodiment, instrument front end 800 includes manual filter holder 502, collimator assembly 504, filter wheel 600, an integrated video camera 802, and an electronics board 804. Instrument front end 800 also includes a plurality of seals configured to maintain, for example, a vacuum or a purge on an atmosphere space 806, shown approximately by box 807 in FIG. 8. Radiation source assembly 12 includes a centerline axis 808 that extends approximately orthogonally with respect to a radiation source device 810, filter wheel assembly 26, containing filter wheel 600, manual filter holder 502, and collimator assembly 504. Centerline axis 808 is offset from a vertical axis 812 by an angle 814 of approximately 45°. Vertical axis 812 refers to an axis that is substantially vertical with respect to the Earth when radiation assembly 10 is held in a hand of the user by grip 310 and being pointed approximately parallel to the ground. Radiation detector assembly 14 includes a centerline axis 816. Centerline axis 816 is offset from vertical axis 812 by an angle 822 of approximately 65°. Centerline axis 808 and centerline axis 816 are laterally offset by an angle (not shown in FIG. 8) of, for example, approximately 10°, meaning radiation detector assembly 14 is shifted laterally (i.e., into or out of the page in FIG. 8) with respect to radiation source assembly 12. The different angles (814, 822) of alignment of radiation source assembly 12 and radiation detector assembly 14 and well as the lateral offset of radiation source assembly 12 and radiation detector assembly 14 are unique features of radiation assembly 10 that facilitate mitigating the effects of Bragg reflection.

In the example embodiment, a proximity sensor 824 is configured to be used as a distance measurement. In one embodiment, the user sets a distance from the sample to be tested and receives feedback from control and display section 308 that provides an indication of the difference between the positions of radiation assembly 10 from the set position. In various embodiments, a plurality of proximity sensors 824 are used to also indicate an angular offset of faceplate 314 with respect to a surface of the sample to be tested.

An apex 826 (FIG. 11) of radiation assembly 10 is defined at the intersection or near intersection of centerline axis 808 and centerline axis 816. Typically, apex 826 is located proximate faceplate 314. In various embodiments, radiation source assembly 12 and/or radiation detector assembly 14 are rotatable about a pivot or axis of rotation 828, 830 respectively. Radiation source assembly 12 and radiation detector assembly 14 are rotatable under control of control and display section 308 to translate apex 826 to selectable locations in front of faceplate 314.

Figure 9:
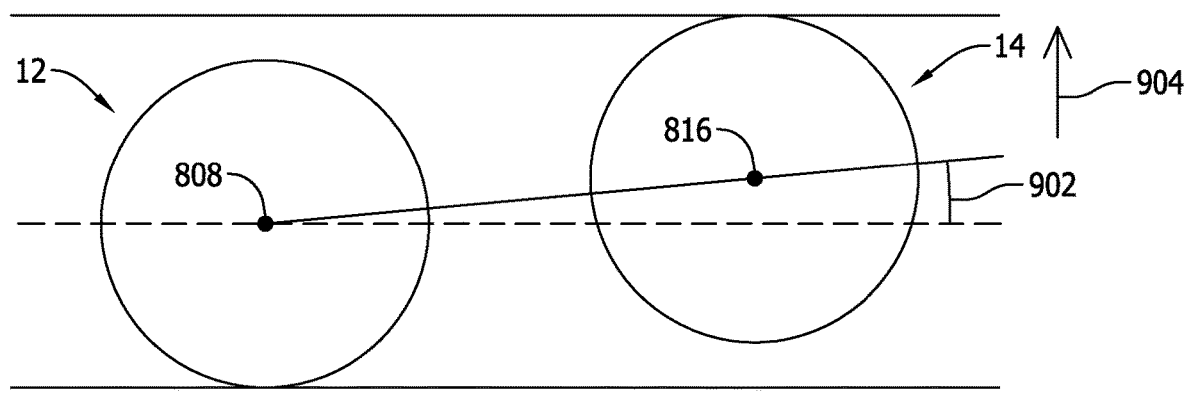

FIG. 9 is a view of instrument front end 800 (shown in FIG. 8) taken along line 9-9 (shown in FIG. 8). In the example embodiment, and as described above centerline axis 808 and centerline axis 816 are laterally offset by an angle 902 of, for example, approximately 10°, meaning radiation detector assembly 14 is shifted laterally in a first direction 904 with respect to radiation source assembly 12.

Figure 10:
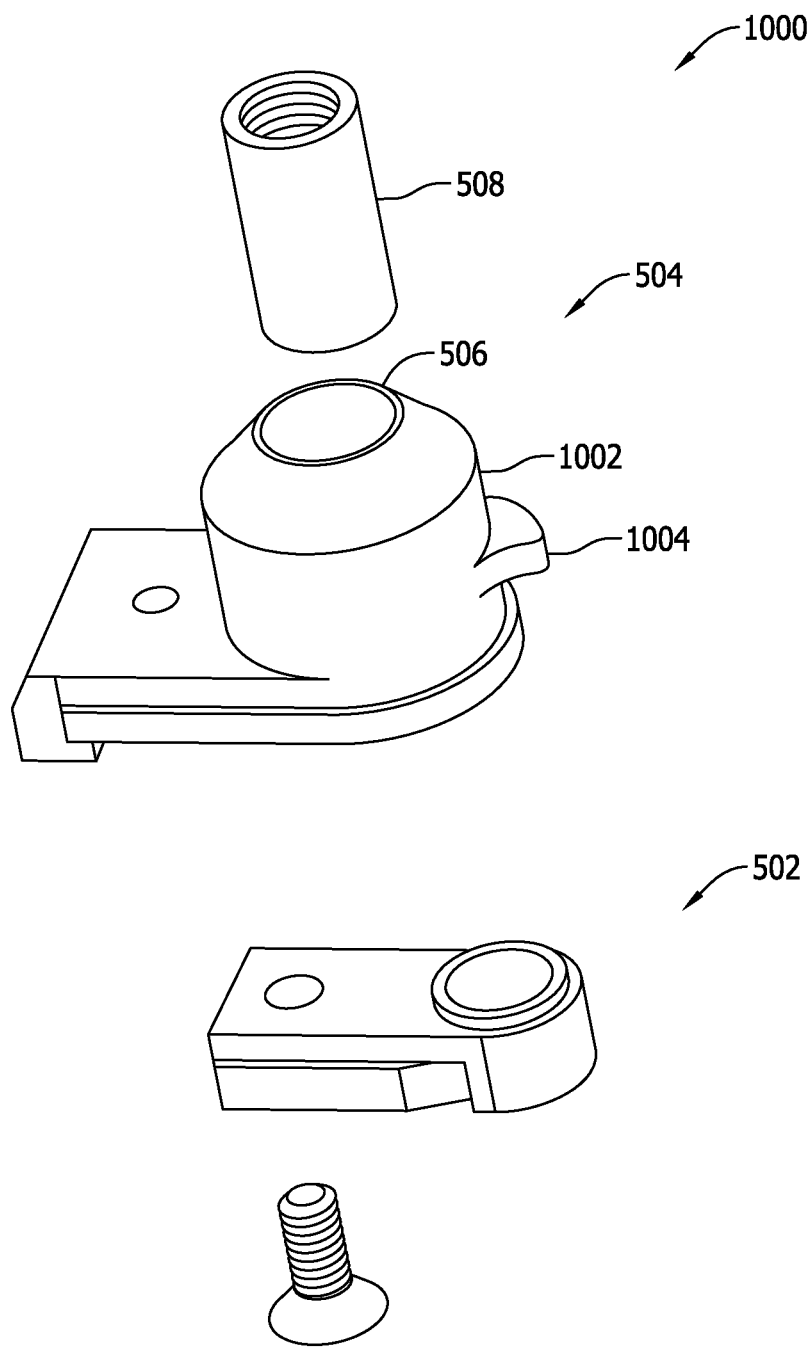

FIG. 10 is an exploded view of collimator assembly 504 and filter wheel assembly 26 that may be used with radiation assembly 10 (shown in FIG. 1). In the example embodiment, collimator assembly 504 includes a collimator carrier 1002 having bore 506 that is configured to receive interchangeable collimator sleeves 508. Collimator sleeves 508 are formed having selectable diameters, such as, but not limited to, 3 millimeter (mm) and 8 mm spot size. A feature 1004 on collimator carrier 1002 engages a switch (not shown in FIG. 10), which communicates with control and display section 308 to notify the user and analyzer 16 which size collimator sleeve 508 is installed.

Figure 11:
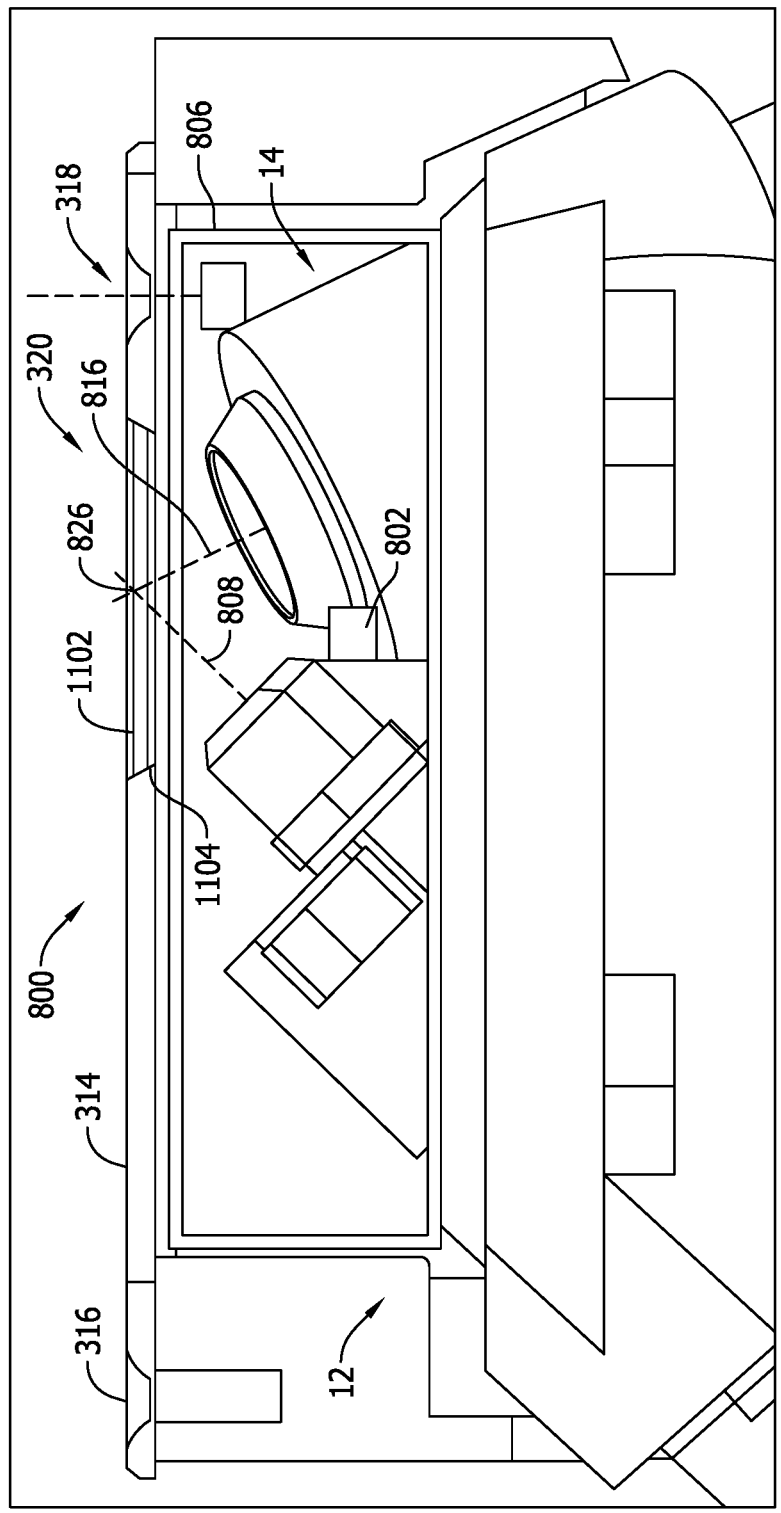

FIG. 11 is another cutaway view of instrument front end 800 of radiation assembly 10. In the example embodiment, instrument front end 800 includes faceplate 314. Atmosphere space 806 is located just inside faceplate 314 and faceplate 314 forms a part of a pressure boundary of atmosphere space 806. Therefore it is necessary for faceplate 314 to be sealed to instrument front end 800 while permitting emissions of radiation and signals relating to the operation of radiation assembly 10 to pass through faceplate 314. For example, second opening 320 is configured to permit passage of radiation from radiation source assembly 12 (shown in FIGS. 1 and 2) and visible, near infrared, and infrared wavelength electromagnetic radiation for reception by integrated video camera 802. To protect the radiation source assembly 12 and/or radiation detector assembly 14 and to prevent leakage of gas from atmosphere space 806 or to prevent inleakage of gas or contaminants into atmosphere space 806 a thin film window 1102 is positioned over first proximity opening 318 and/or second opening 320. In various embodiments, thin film window 1102 is formed of Ultralene®, Kapton®, Prolene®, or the like. First proximity opening 318 is closed with lens essentially transparent to infrared radiation. Second opening 320 is covered by thin film window 1102 on one side of faceplate 314. Thin film window 1102 is transparent to X-rays. A grid structure 1104 supports and protects thin film window 1102. Grid structure 1104 also includes structural components that improves visibility of the sample to be tested through integrated video camera 802 compared to other geometries.

Figure 12:
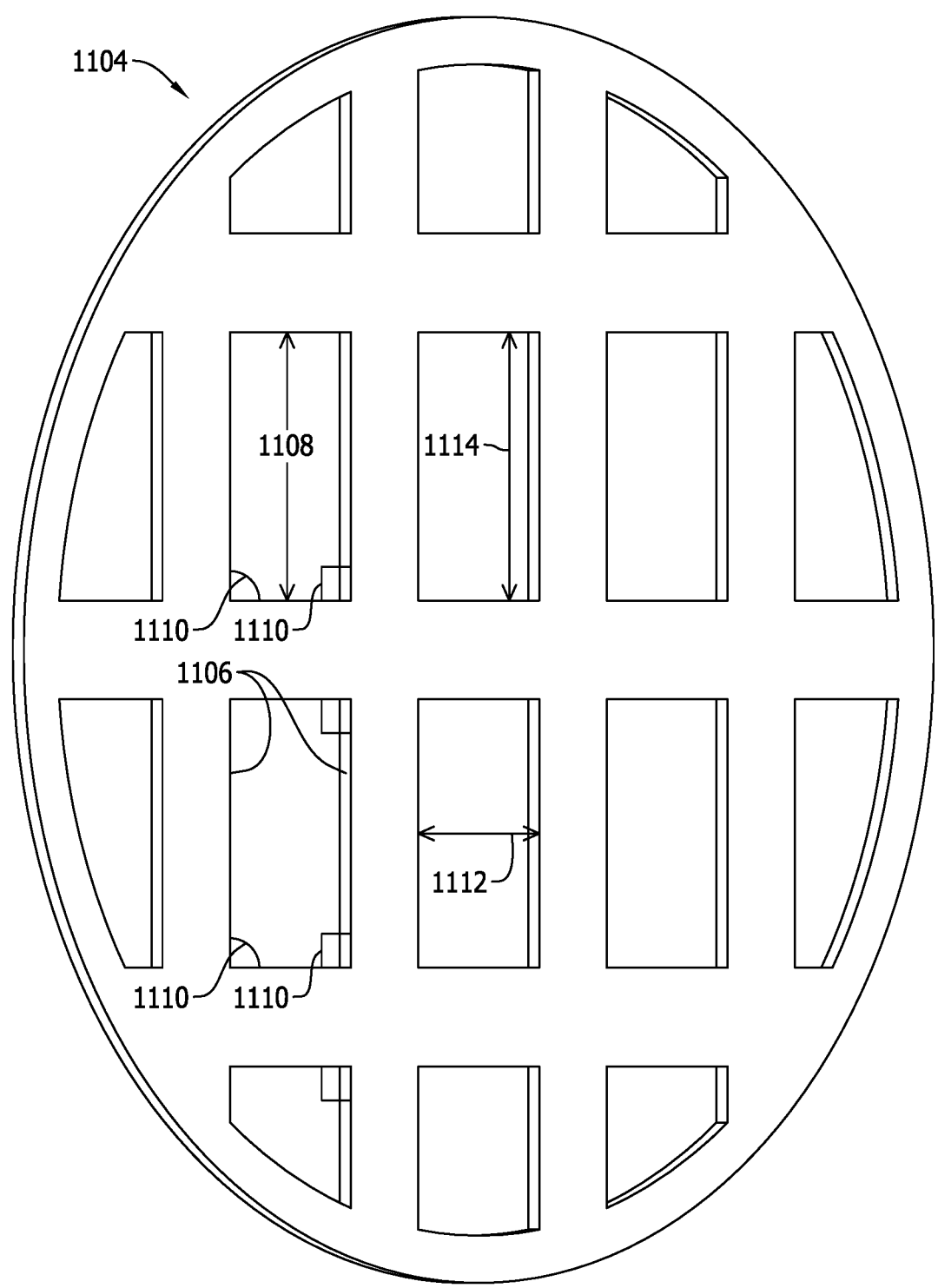

FIG. 12 is a perspective view of grid structure 1104 (shown in FIG. 11. In the example embodiment, grid structure 1104 includes vertical grid members 1106 and horizontal grid members 1108 that intersect at an angle 1110 approximately 90° with respect to each other. In one embodiment, a spacing 1112 between adjacent vertical grid members 1106 and a spacing 1114 between horizontal grid members 1108 is uniform and selected to provide a maximum open area of grid structure 1104. In various embodiments, spacing 1112 between adjacent vertical grid members 1106 and spacing 1114 between horizontal grid members 1108 is variable and selected to provide a maximum visual and/or X-ray transparency.

Figure 13:
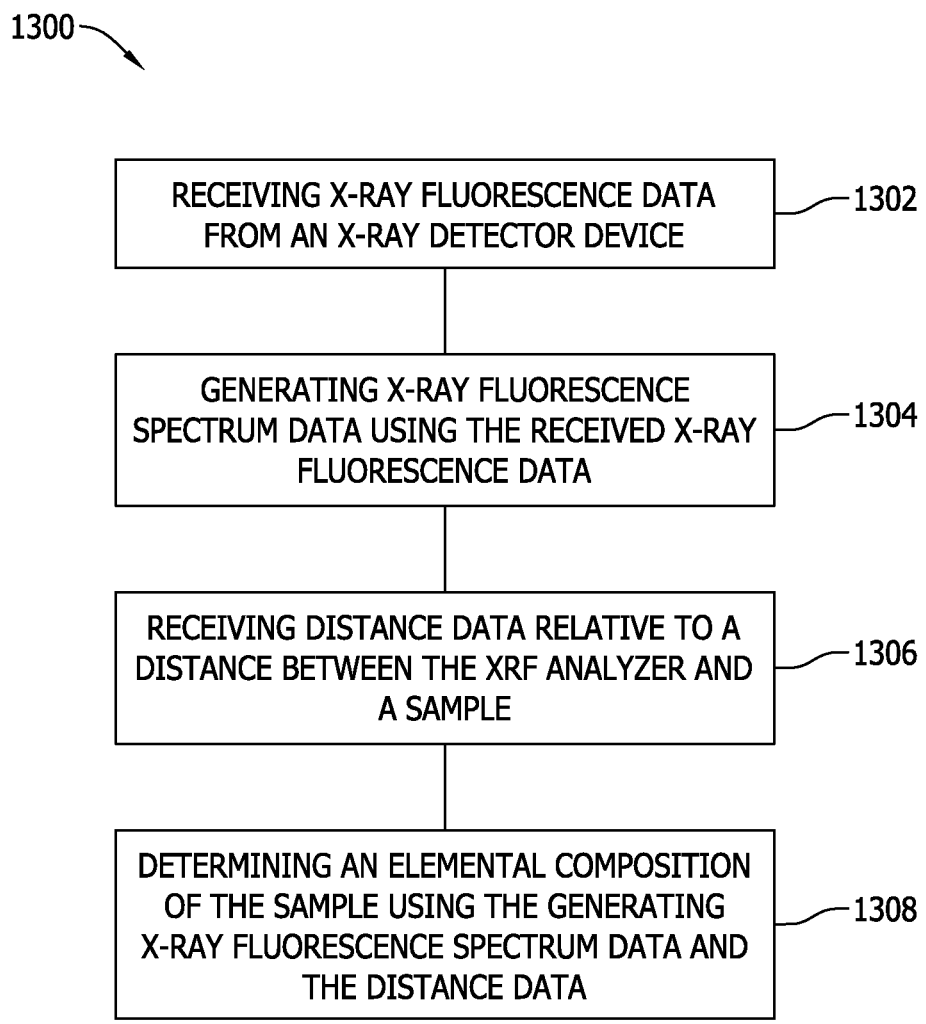

FIG. 13 is a flow chart of a method 1300 of processing X-ray fluorescence data in a hand-held X-ray Fluorescence (XRF) analyzer. In one embodiment, the method is implemented using a computer device coupled to a memory device. In the example embodiment, method 1300 includes receiving 1302 X-ray fluorescence data from an X-ray detector device, generating 1304 X-ray fluorescence spectrum data using the received X-ray fluorescence data, receiving 1306 distance data relative to a distance between the XRF analyzer and a sample, and determining 1308 an elemental composition of the sample using the generated X-ray fluorescence spectrum data and the distance data.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by mobile devices, clusters, personal computers, workstations, clients, servers, and processors wherein the memory includes RAM memory, ROM memory, EPROM memory, EEPROM memory, and non-volatile RAM (NVRAM) memory. The above memory types are examples only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network. The technical effect of the methods and systems may be achieved by performing at least one of the following steps: (a) filtering a stream of X-rays using a plurality of filters arranged in series in a path of the stream of X-rays, (b) reducing Bragg reflections using the beam geometry defined by the relative physical positions and directional positions of the radiation source assembly and radiation detector assembly, (c) removably mounting auxiliary analyzers and support components on a quick-change instrument rail, (d) continuously monitoring a distance of the faceplate of the analyzer to the sample to be tested and providing a distance indication to the user and using the distance indication in analyzing the sample data, and (e) wirelessly communicating between the XRF analyzer and an offboard processor to perform analysis of sample data in real-time during a test of a sample.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

As used herein, the term "cloud computing" and related terms, e.g., "cloud computing devices" refers to a computer architecture allowing for the use of multiple heterogeneous computing devices for data storage, retrieval, and processing. The heterogeneous computing devices may use a common network or a plurality of networks so that some computing devices are in networked communication with one another over a common network but not all computing devices. In other words, a plurality of networks may be used in order to facilitate the communication between and coordination of all computing devices.

As used herein, the term "mobile computing device" refers to any of computing device which is used in a portable manner including, without limitation, smart phones, personal digital assistants ("PDAs"), computer tablets, hybrid phone/computer tablets ("phablet"), or other similar mobile device capable of functioning in the systems described herein. In some examples, mobile computing devices may include a variety of peripherals and accessories including, without limitation, microphones, speakers, keyboards, touchscreens, gyroscopes, accelerometers, and metrological devices. Also, as used herein, "portable computing device" and "mobile computing device" may be used interchangeably.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

This written description uses examples to describe the disclosure, including the best mode, and also to enable any person skilled in the art to practice the disclosure, including making and using any devices or systems and performing any incorporated methods. The patentable scope of the application is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An X-ray fluorescence (XRF) analyzer comprising:
    a radiation source assembly comprising a first centerline axis and configured to direct an X-ray beam to impinge on a sample to be tested;
    a radiation detector assembly comprising a second centerline axis configured to sense X-ray fluorescence (XRF) emitted from the sample in response to the X-ray beam;
    a proximity sensor configured to continuously measure a distance between said XRF analyzer and the sample to be tested, the distance being at least one of displayed to a user and used to determine a property of the sample to be tested;
    a faceplate including a faceplate opening through which the X-ray beam and the X-ray fluorescence emitted from the sample pass;
    a thin film window positioned over the opening;
    a grid structure positioned over the thin film window and configured to support and protect said thin film window; and
    a processor configured to:
        generate X-ray fluorescence spectrum data using the emitted X-ray fluorescence data;
        receive distance data relative to the distance between said XRF analyzer and the sample;
        determine a property of the sample to be tested from the emitted X-ray fluorescence data and the received distance data; and
        output the determined property to a user.

2. The XRF analyzer of claim 1, further comprising a plurality of proximity sensors, said processor configured to determine a positional orientation of the XRF analyzer with respect to the sample to be tested using the plurality of proximity sensors.

3. The XRF analyzer of claim 1, wherein the first centerline axis and the second centerline axis are offset laterally by a first angle.

4. The XRF analyzer of claim 3, wherein the first angle is selected to facilitate reducing Bragg reflections.

5. The XRF analyzer of claim 4, wherein the first angle is less than 30°.

6. The XRF analyzer of claim 5, wherein the first angle is approximately 10°.

7. The XRF analyzer of claim 1, wherein a projection of the first centerline axis on a plane and a projection of the second centerline axis on the plane intersect to form a second angle.

8. The XRF analyzer of claim 7, wherein the second angle is selectively variable to modify a position of an intersection of the projection of the first centerline axis and the projection of the second centerline axis on the plane.

9. The XRF analyzer of claim 7, wherein the second angle is selected to facilitate reducing Bragg reflections.

10. The XRF analyzer of claim 9, wherein, the second angle is less than 90°.

11. The XRF analyzer of claim 10, wherein the second angle equals approximately 70°.

12. The XRF analyzer of claim 1, further comprising a Near Field Communications (NFC) reader/writer configured to sense a presence or absence of predetermined accessories.

13. The XRF analyzer of claim 12, wherein said NFC reader/writer is configured to sense at least one of a position and an orientation of the XRF analyzer and prevent operation of the radiation source assembly.

14. The XRF analyzer of claim 12, wherein said NFC reader/writer is configured to sense when the XRF analyzer is installed in an accessory and to at least one of permit and prevent activation of predetermined operational features or modes.

15. The XRF analyzer of claim 1, wherein said thin film window is formed of a thin film material.

16. The XRF analyzer of claim 15, wherein said thin film material comprises at least one of a polyimide material, a polymeric material, and a polypropylene material, and combinations thereof.

17. The XRF analyzer of claim 1, further comprising an integrated video camera, structural components of said grid structure are positioned to improve a visibility of the sample to be tested through said integrated video camera.

18. The XRF analyzer of claim 1, wherein a spacing between adjacent grid members oriented in a first direction and a spacing between adjacent grid members in a second direction is uniform and selected to provide a maximum open area of grid structure.

19. The XRF analyzer of claim 1, wherein a spacing between adjacent grid members oriented in a first direction and a spacing between adjacent grid members oriented in a second direction is variable and selected to provide a maximum visual and/or X-ray transparency.

20. The XRF analyzer of claim 1, wherein grid structure includes adjacent grid members oriented in a first direction and adjacent grid members oriented in a second direction that intersect at an angle of approximately 90° with respect to each other.

21. A method of processing X-ray fluorescence data in a hand-held X-ray Fluorescence (XRF) analyzer, the method implemented using a computer device coupled to a memory device, the method comprising:
  receiving, by the computer device, X-ray fluorescence data from an X-ray detector device;
  generating X-ray fluorescence spectrum data using the received X-ray fluorescence data;
  receiving, by the computer device, distance data relative to a distance between the XRF analyzer and a sample; and
  determining an elemental composition of the sample using the generated X-ray fluorescence spectrum data and the received distance data.

22. The method of claim 21, further comprising emitting a beam of X-rays from a radiation source assembly positioned onboard the XRF analyzer.

23. The method of claim 21, wherein the XRF analyzer includes a selectable filter assembly including a plurality of individually selectable filters in series with a separate manual filter assembly selectable between a first filter-in position and a second no-filter position, said method further comprising:
  selecting a first filter of the plurality of individually selectable filters;
  indicating, to the computer device, the filter selected;
  selecting one of the first filter-in position and the second no-filter position on the separate manual filter assembly; and
  receiving radiation through the selected filter and the separate manual filter assembly.

24. The method of claim 21, wherein the XRF analyzer includes a visual display, and wherein generating X-ray fluorescence spectrum data comprises:
  transmitting raw spectrum data to the visual display in real-time;
  receiving a user selection from an input device associated with the visual display; and
  modifying the raw spectrum data based on the received user selection.

25. The method of claim 21, wherein the XRF analyzer includes an instrument mounting rail coupled to the XRF analyzer, the method further comprising receiving a signal from an instrument mounted on the instrument mounting rail.

26. The method of claim 21, wherein receiving X-ray fluorescence data from an X-ray detector device comprises receiving X-ray photons emitted from a sample through a faceplate window by the X-ray detector device, the method further comprising receiving a live video image through the faceplate window from an integrated video camera.

27. The method of claim 21, further comprising transceiving wirelessly, augmented reality data between the XRF analyzer and an augmented reality device wearable by a user and communicatively coupled to the XRF analyzer.

28. One or more non-transitory computer-readable storage media having computer-executable instructions embodied thereon, wherein when executed by at least one processor of an X-ray fluorescence (XRF) analyzer, the computer-executable instructions cause the processor to:
  select a first filter of a plurality of individually selectable filters;
  indicate, to the at least one processor, the filter selected;
  select one of a first filter-in position and a second no-filter position on a separate manual filter assembly;
  emit radiation through the selected filter and the separate manual filter assembly;
  receive, by the at least one processor, X-ray fluorescence data from an X-ray detector device of the XRF analyzer;
  generate X-ray fluorescence spectrum data using the received X-ray fluorescence data;
  receive, by the at least one processor, distance data relative to a distance between the XRF analyzer and a sample;
  determine an elemental composition of the sample using the generated X-ray fluorescence spectrum data and the distance data;
  transmit raw spectrum data to a visual display in real-time;
  receive a user selection from an input device associated with the visual display; and
  modify the raw spectrum data based on the received user selection.

29. The computer-readable storage media of claim 28, wherein the computer-executable instructions further cause the processor to:
  receive a signal from an instrument mounted on an instrument mounting rail coupled to the XRF analyzer;
  receive a live video image through a window of the XRF analyzer from an integrated video camera; and transceive wirelessly, augmented reality data between the XRF analyzer and an augmented reality device wearable by a user and communicatively coupled to the XRF analyzer.

\* \* \* \* \*